US005137324A

United States Patent [19]
Hershberger

[11] Patent Number: 5,137,324
[45] Date of Patent: Aug. 11, 1992

[54] RETAINING COVER FOR AN OPEN BACK TRUCK

[76] Inventor: Virginia L. Hershberger, 304 Courtleigh, Wichita, Kans. 67206

[21] Appl. No.: 263,394

[22] Filed: Oct. 27, 1988

[51] Int. Cl.$^5$ .......................... B60P 7/04; D04G 1/00
[52] U.S. Cl. ..................................... 296/100; 410/97; 289/16.5; 289/18.1
[58] Field of Search ................ 296/100; 160/354, 404, 160/327, 329; 289/16.5, 18.1; 410/97

[56] References Cited

U.S. PATENT DOCUMENTS

| 3,237,778 | 3/1966 | Hoodis | 160/354 |
| 3,481,371 | 12/1969 | Row | 296/100 X |
| 3,564,876 | 2/1971 | Titone | 66/195 X |
| 3,653,233 | 4/1972 | Titone | 66/195 X |
| 3,724,457 | 4/1973 | Klatte | 66/195 X |
| 4,215,453 | 8/1980 | Matsuda | 66/195 X |
| 4,433,493 | 2/1984 | Poisson | 66/195 X |
| 4,739,528 | 4/1988 | Allen | 296/100 X |

OTHER PUBLICATIONS

*Federal Standard Stitches, Seams, and Stitchings,* Fed. Stp. No. 751, Aug. 14, 1959, Stitch Types 101, 102, 103, 104.

Primary Examiner—Margaret A. Focarino
Assistant Examiner—Andrew C. Pike
Attorney, Agent, or Firm—John Wade Carpenter

[57] ABSTRACT

An openly woven mesh cover extends over an open back of an open-back vehicle. The cover has a border member having a pair of superimposed flexible sheet members. A border strand is enclosed by the pair of flexible sheet members. A connector removably secures the border member to the back perimeter of the open-back vehicle. A plurality of warp strands extend longitudinally and connect to the border strand, and a plurality of weft strands extend cross-wise and secure to the warp strands and to the border strands. The cover additionally comprises a border seam passing through the pair of flexible sheet members for securing the pair of flexible sheet members together.

10 Claims, 6 Drawing Sheets

FIG. 1
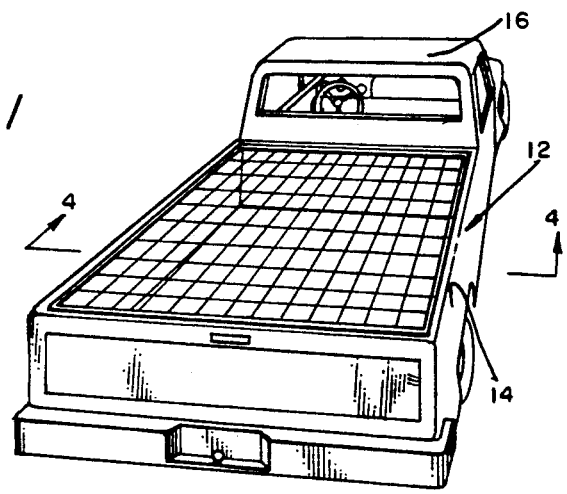
FIG. 2
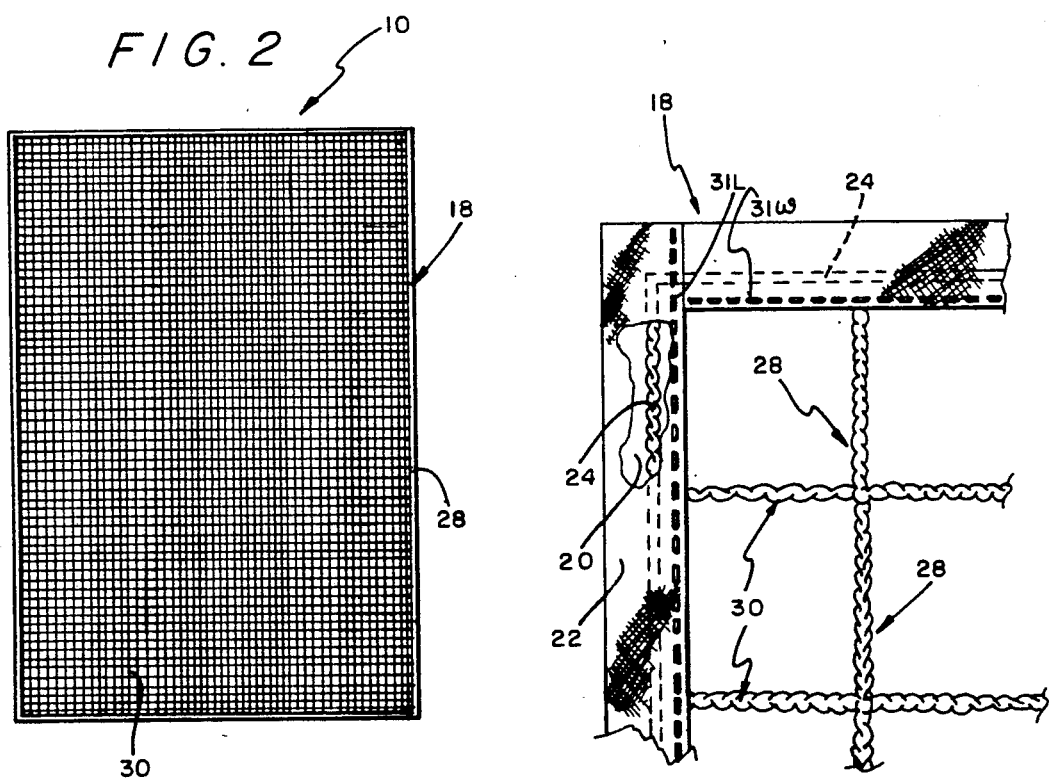
FIG. 3

RETAINING COVER FOR AN OPEN BACK TRUCK

FIELD OF THE INVENTION

The invention is related to a cover for an open back truck. More specifically, this invention provides the combination of an article filled open back vehicle having a back perimeter and an openly woven mesh cover extended over the open back of the open back truck to keep articles from being blown from the open back during transit.

DESCRIPTION OF THE PRIOR ART

A patentability investigation was conducted and the following United States Patents were discovered: U.S. Pat. No. 2,043,858; 3,481,371; 4,061,394; 4,518,194; 4,525,416; and 4,547,014. None of the foregoing patents teach or suggest the particular cover of this invention.

SUMMARY OF THE INVENTION

The present invention broadly accomplishes its desired objects by providing for an openly woven mesh cover extended over an open back of an open back vehicle. The cover comprises a border member having a pair of superimposed flexible sheet members. A border strand is enclosed by the pair of flexible sheet members; and a connecting means is provided for removably securing the border member to a back perimeter of an article filled open back vehicle. A plurality of warp strand means extends longitudinally and connects to the border strand. A plurality of weft strand means extends cross-wise and is secured to the warp strand means and to the border strand. The cover additionally comprises a border seam passing through the pair of flexible sheet members for securing the pair of flexible sheet members together.

It is therefore an object of the invention to provide for an openly woven mesh cover.

It is another object of the invention to provide for a combination of an article filled open-back vehicle and an openly woven mesh cover extended over the open back of the article filled open-back vehicle.

These, together with the various ancillary objects and features which become apparent to those skilled in the art as the following description proceeds, are attained by this novel cover and combination cover-article filled open back vehicle, a preferred embodiment being shown with reference to the accompanying drawings, by way of example only, wherein:

BRIEF DESCRIPTION OF THE DRAWINGS

FIG. 1 is a perspective view of an open-back vehicle having the open back covered with an openly woven mesh cover;

FIG. 2 is a top plan view of the cover;

FIG. 3 is a partial top plan view of a corner of the cover disclosing the border strand between a pair of border members and a warp strand secured to a weft strand and to the border strand which also secures to the weft strand.

DETAILED DESCRIPTION OF THE INVENTION

Figure 4:
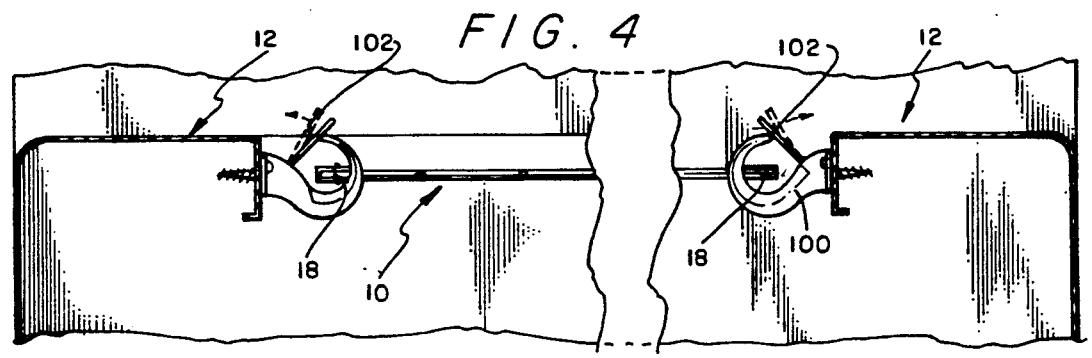
FIG. 4 is a partial vertical sectional view taken in direction of the arrows and along the plane of line 4—4 in FIG. 1.

Referring in detail now to the drawings wherein similar parts of the invention are identified by like reference numerals, there is seen an openly woven mesh cover, generally referred as 10, secured on a perimeter, generally illustrated as 12, of an open back 14 of an open-back vehicle 16 for retaining articles 13 (e.g. leaves, grooves, laundry, etc.) in the back 14 and prevents them from blowing away while the vehicle 16 is traveling. The cover 10 has a border, generally illustrated as 18, that consist of a lower flexible sheet member 20 and an upper flexible sheet member 22 superimposed to the lower flexible sheet member 20 and integrally bound thereto. The lower and upper flexible sheet members 20 and 22 are preferably manufactured of a moisture-proof fabric such as canvas. Disposed between and enclosed by the two sheet members 20 and 22 is a border strand 24 which is preferably endless around the perimeter of the cover 10. Border strand 24 is also preferably manufactured of a moisture proof material, such as nylon or the like. A connector means, generally illustrated as 26 (see FIGS. 10 and 11), is removably secured to the border 18 for removably securing the cover 10 to the perimeter 12 of the open back 14 of the vehicle 16. The cover 10 further comprises a plurality of warp strand means, generally illustrated as 28, extending longitudinally and connecting to the border strand 24, and a plurality of weft strand means, generally illustrated as 30, which extend crosswise (or width-wise) with each being secured to the warp strand means 28 and to the border strand 24 (see FIG. 3). A border seam 31W passes through the pair of flexible sheet members 20 and 22 in a widthwise stitching direction and a border seam 31L passes through the pair of flexible sheet members 20 and 22 in a longitudinal stitching direction, all for securing the sheet members 20 and 22 together and for retaining the border strand 24 therebetween.

Figure 18:
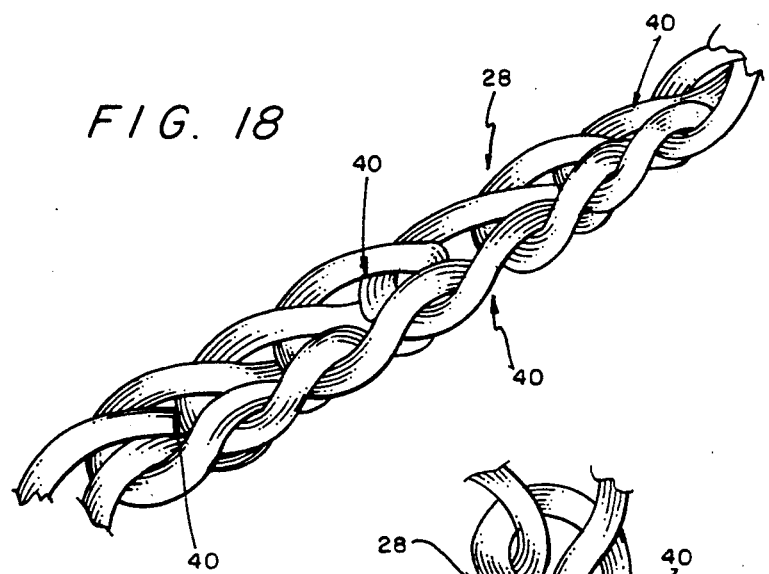
FIG. 18 is a partial perspective view of a warp strand or a weft strand.
Figure 19:
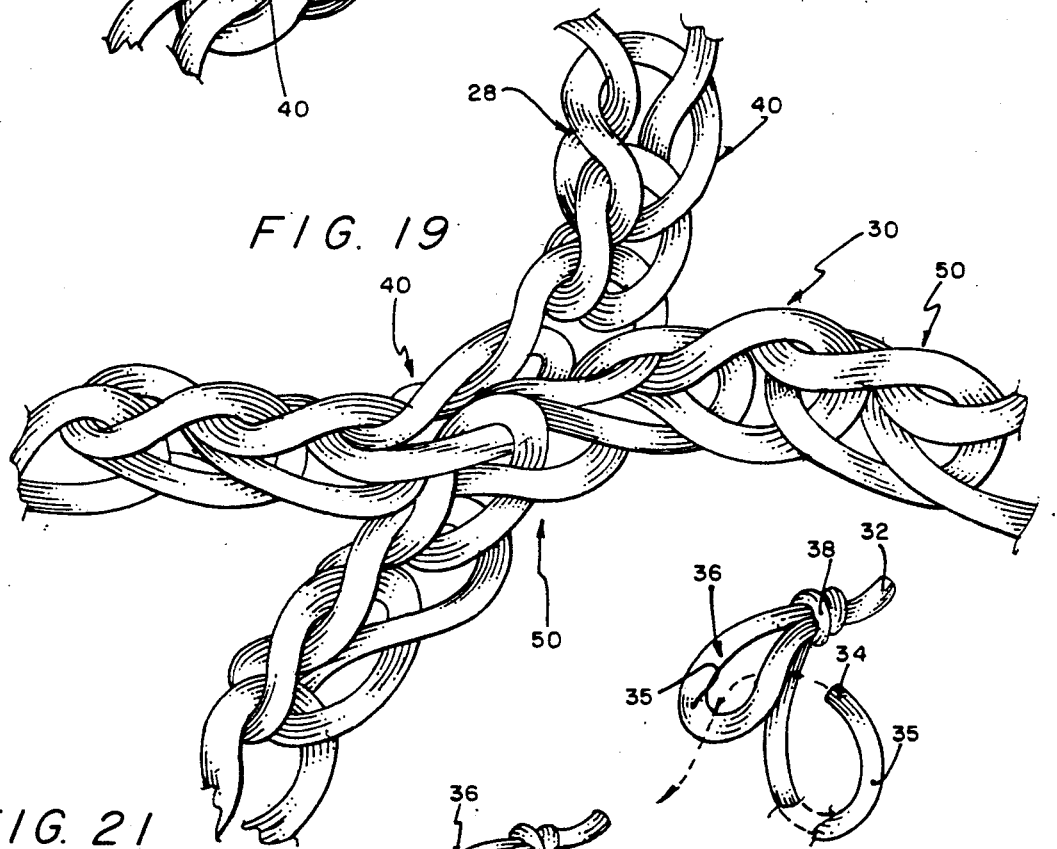
FIG. 19 is a partial perspective view of a warp strand interconnected to a weft strand.
Figure 20:
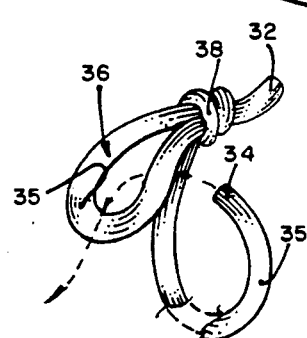
FIG. 20 is a perspective view of a first loop of a warp or weft strand with the direction of the arrows showing the passage of the end of the warp or weft strand to form an initial secondary loop.
Figure 21:
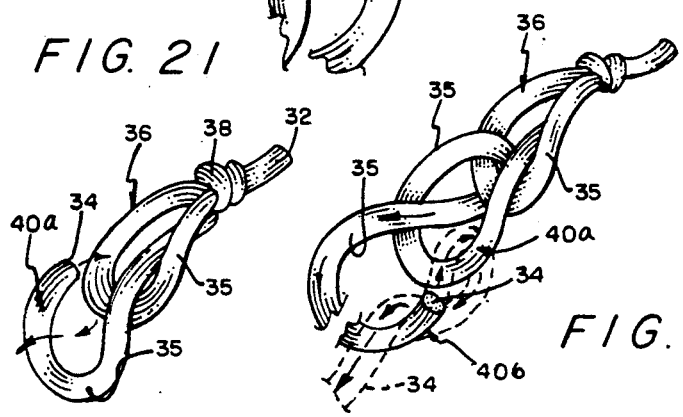
FIG. 21 is a continuation of the perspective view of FIG. 20 with the direction of the arrows showing the passage of the end of the warp or weft strand to form an initial secondary loop.
Figure 22:
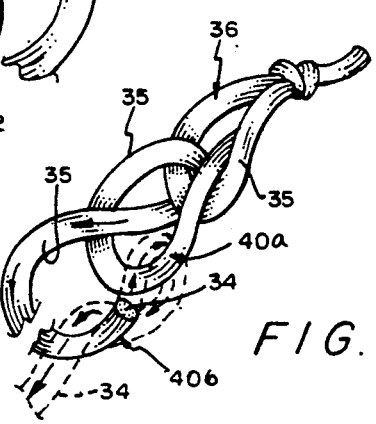
FIG. 22 is a perspective view of a first loop secured to an initial secondary loop of a warp or weft strand with the direction of the arrows showing the passage of the end of the warp or weft strand to form a secondary loop interconnected to the initial secondary loop.

The warp strands means 28 and the weft strand means 30 of this invention are formed identically. Therefore, even though FIG. 18 particularly illustrates the warp strand means 28, FIG. 18 could just as well illustrate the weft strand means 30. As best illustrated in FIGS. 20-22, each of the warp strand means 28 comprises a pair of warp ends 32 and 34, both of which secure to the border strand 24, and a warp strand 35. The warp strand means 28 further comprises a first warp loop 36 (which is the initial warp loop off or from the border strand 24) which is formed by looping warp end 32 and forming a non-slip knot 38 in close proximity to the warp end 32. A plurality of secondary warp loops, each identified generally as 40, interconnect with each other as illustrated in FIG. 18. One of the secondary warp loops (identified as 40a) in FIG. 22 is secured to and formed around the first warp loop 36 by passing the warp end 34 through the first warp loop 36 (see FIG. 20) and then looping a structural part of the warp strand 35 in close proximity to the first warp loop 36 (see FIG. 21) into the secondary warp loop 40a. Subsequently, the warp end 34 is passed over, through and under the first warp loop 36 (see FIG. 21); and then the warp end 34 is passed through the initial secondary loop 40a to form the remaining interconnecting secondary warp loops 40 identically to the procedure that the initial secondary loop 40a was formed.

More specifically, after the secondary warp loop 40a has been formed, another secondary warp loop (identified as dotted lines and as 40b in FIG. 22) is secured to and around the secondary warp loop 40a by passing the warp end 34 through the secondary warp loop 40a (see FIG. 220) and then looping a structural part of the warp strand 35 in close proximity to the secondary warp loop 40a into the secondary warp loop 40b. Thereafter, the warp end 34 is passed over, through and under the secondary warp loop 40b to form additional secondary warp loops 40 identical to the procedure secondary warp loops 40a and 40b were formed. After the desired number of secondary warp loops 40 have been formed interconnectively, they may be terminated with a second warp loop and a non-slip knot (both not shown in the drawings) which are identical to the first warp loop 36 of FIG. 20 having the non-slip knot 38.

Figure 23:
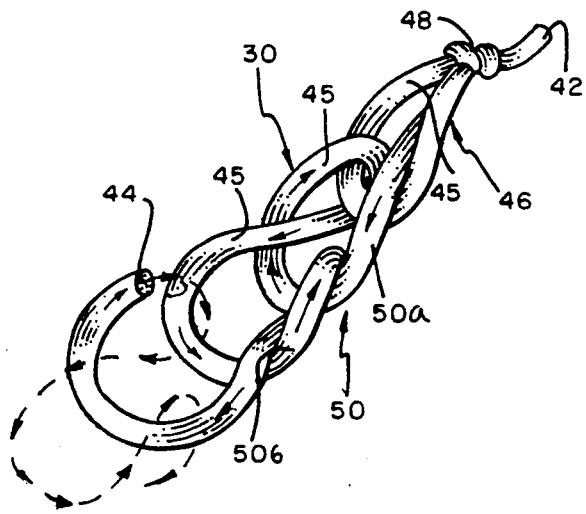
FIG. 23 is a continuation of the perspective view of FIG. 22 with the direction of the arrows showing the passage of the end of the warp or weft strand to form a third or a second secondary loop interconnected to the secondary loop that is interconnected to the initial secondary loop.
Figure 24:
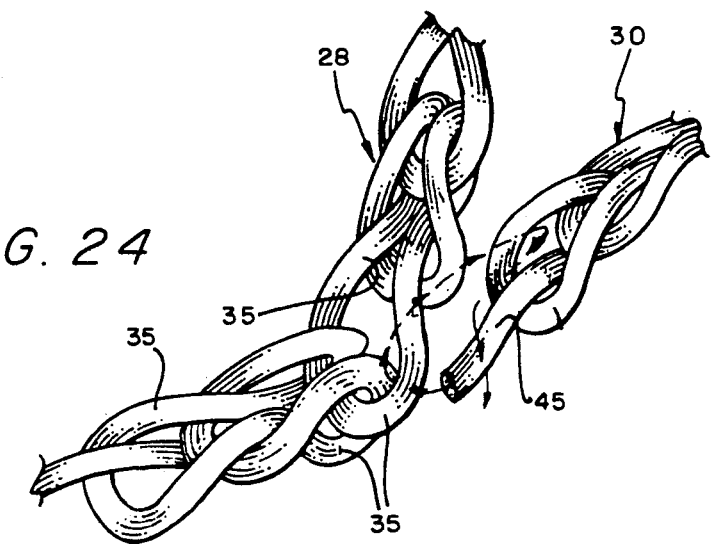
FIG. 24 is a partial perspective view of a warp strand and a weft strand with the direction of the arrows showing the passage of an end to interconnect the warp strand with the weft strand.

As was previously indicated, the warp strand means 28 is identical to the weft strand means 30, and is therefore, the weft strand means 30 is formed identically as the warp strand means is formed. More specifically (as best shown in FIG. 23), each of the weft strand means 30 comprises a pair of weft ends 42 and 44, both of which secure to the border strand 24, and a weft strand 45.

The weft strand means 30 further comprises a first weft loop 46 (which is the initial weft loop off or from the border strand 24) which is formed by looping weft end 42 and forming a non-slip knot 48 in close proximity to the weft end 42. A plurality of secondary weft loops, each identified generally as 50, interconnect with each other as illustrated in FIG. 23. One of the secondary weft loops (identified as 50a) in FIG. 23 is secured to and formed around the first weft loop 46 by passing the warp end 44 through the first weft loop 46 and then looping a structural part of the weft strand 45 in close proximity the first weft loop 46 into the secondary weft loop 50a (see and in accordance with the direction of the arrows in FIG. 23). Subsequently, the weft end 44 is passed, over, through and under the first weft loop 46 (see FIG. 23) and then through the secondary weft loop 50a to form additional and the remaining interconnecting secondary weft loops 50. More specifically, after the secondary weft loop 50a has been formed, another secondary weft loop (identified as 50b in FIG. 23) is secured to and around the secondary weft loop 50a by passing the warp end 44 through the secondary weft loop 50a (see FIG. 23) and then looping a structural part of the weft strand 45 in close proximity to the secondary weft loop 50b. Thereafter, the weft end 44 is passed over, through and under the secondary weft loop 50a and then through the secondary weft loop 50b to form additional secondary weft loops 50 identical to the procedure secondary weft loops 50a and 50b were formed. After the desired number of secondary weft loops 50 have been formed interconnectively, they may be terminated with a second weft loop and a non-slip knot (both not shown in the drawings) which are identical to the first weft loop 46 of FIG. 23 having the non-slip knot 48.

Figure 25:
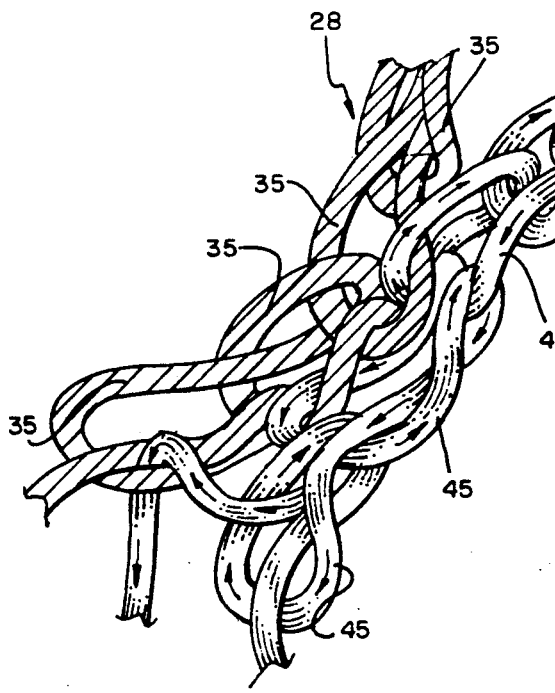
FIG. 25 is a partial perspective view of a warp strand interconnected to a weft strand with the direction of the arrows showing the passage of an end such that the warp strand and the weft strands are interconnected.
Figure 26:
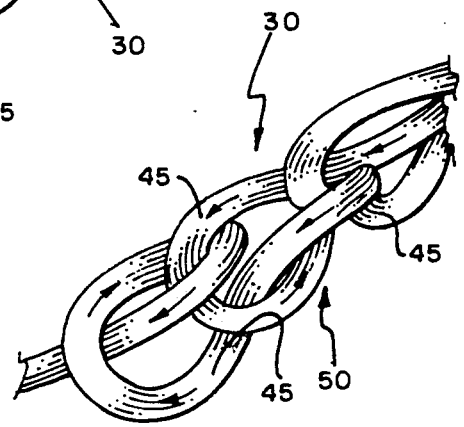
FIG. 26 is a bottom plan perspective view of the warp or weft strand in FIG. 25.

The warp strand means 28 and the weft strand means 30 are secured together at the points or junctions where they cross each other (see FIG. 2 and 3). As best illustrated in FIG. 25, the securing points are defined by at least one (preferably three) secondary warp loops 40 looped or engaged to at least one (preferably three) secondary weft loops 50. Alternatively, at least one (preferably three) secondary weft loops 50 is looped or engaged to at least one (preferably three) secondary warp loops 40. Such securing points are defined by the second weft end 44 passing through at least one of the secondary warp loops 40 while the secondary weft loops 50 are being formed, or by the second warp end 34 passing through at least one of the secondary weft loops 50 while the secondary warp loops 40 are being formed.

Figure 5:
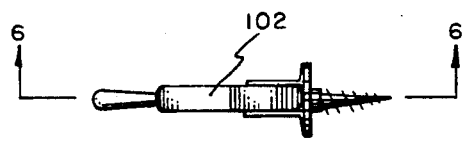
FIG. 5 is a top plan view of one of the hooking elements which secures to the perimeter of the open back vehicle.
Figure 6:
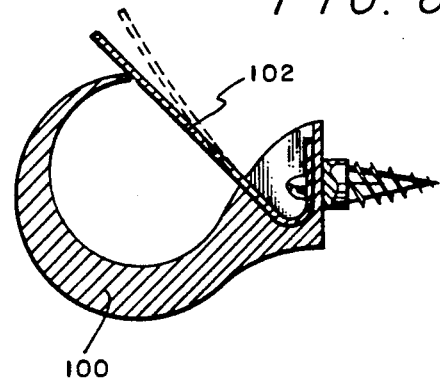
FIG. 6 is a vertical sectional view taken in direction of the arrows and along the plane of line 6—6 in FIG. 5.
Figure 7:
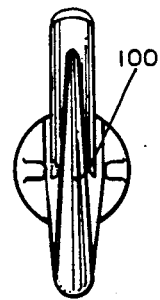
FIG. 7 is an end elevational view of the hooking element of FIGS. 5 and 6.
Figure 8:
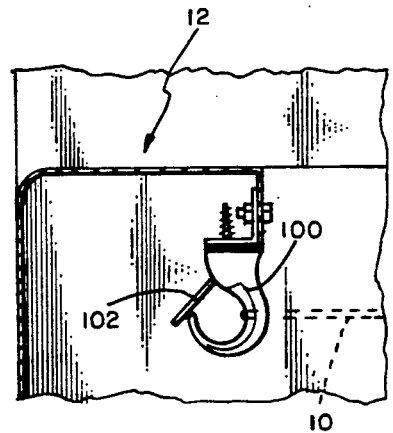
FIG. 8 is the hooking element of FIGS. 5, 6 and 7 secured to an L-member which is secured to the perimeter of the open back of an open back vehicle.
Figure 9:
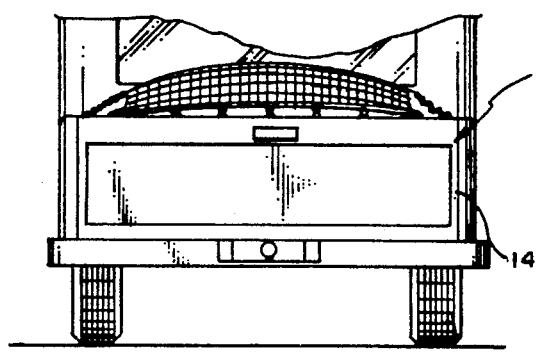
FIG. 9 is a rear elevational view of an open back vehicle having articles and the cover in an expanded form covering the articles and secured to the perimeter of the open back.
Figure 13:
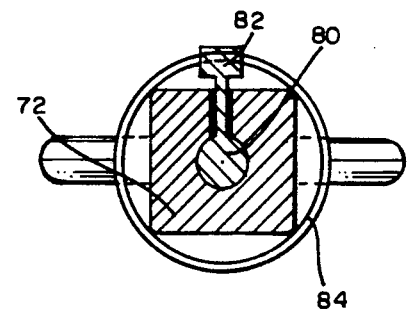
FIG. 13 is a vertical sectional view taken in direction of the arrows and along the plane of line 13—13 in FIG. 12.
Figure 10:
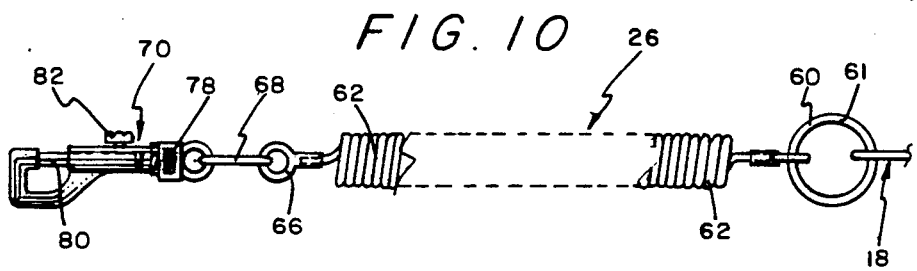
FIG. 10 is a side elevational view of the stretchable connector that is used to secure the cover to the perimeter of the open back vehicle.
Figure 11:
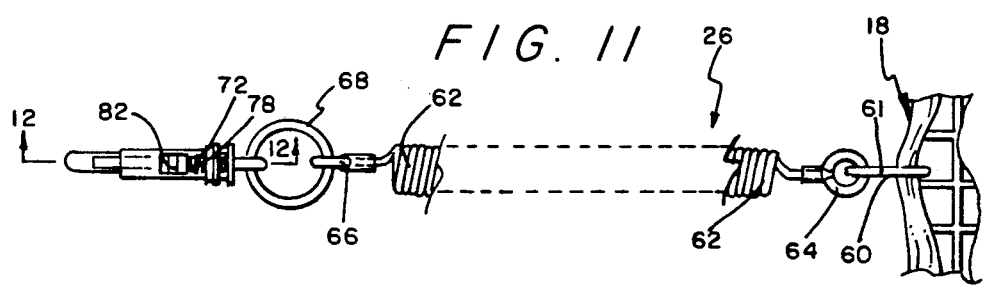
FIG. 11 is a top plan view of the stretchable connector of FIG. 10.
Figure 12:
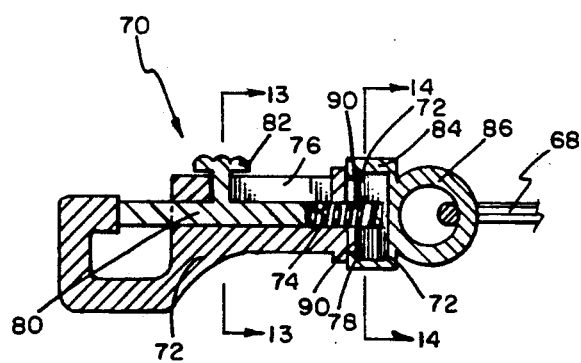
FIG. 12 is a vertical sectional view taken in direction of the arrows and along the plane of line 12—12 in FIG. 11.
Figure 14:
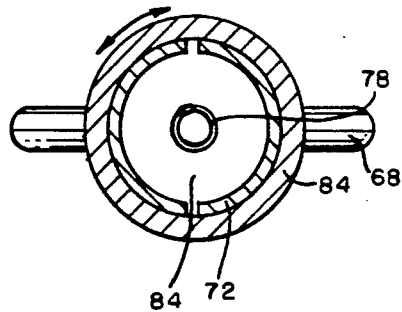
FIG. 14 is a vertical sectional view taken in direction of the arrows and along the plane of line 14—14 in FIG. 12.
Figure 15:
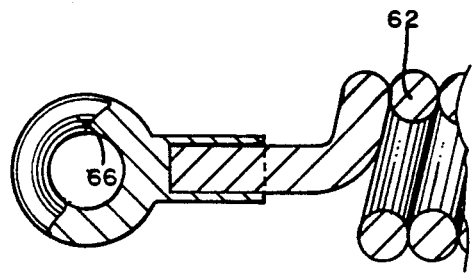
FIG. 15 is an exploded partial vertical sectional view of an end of the helical stretchable member.
Figure 16:
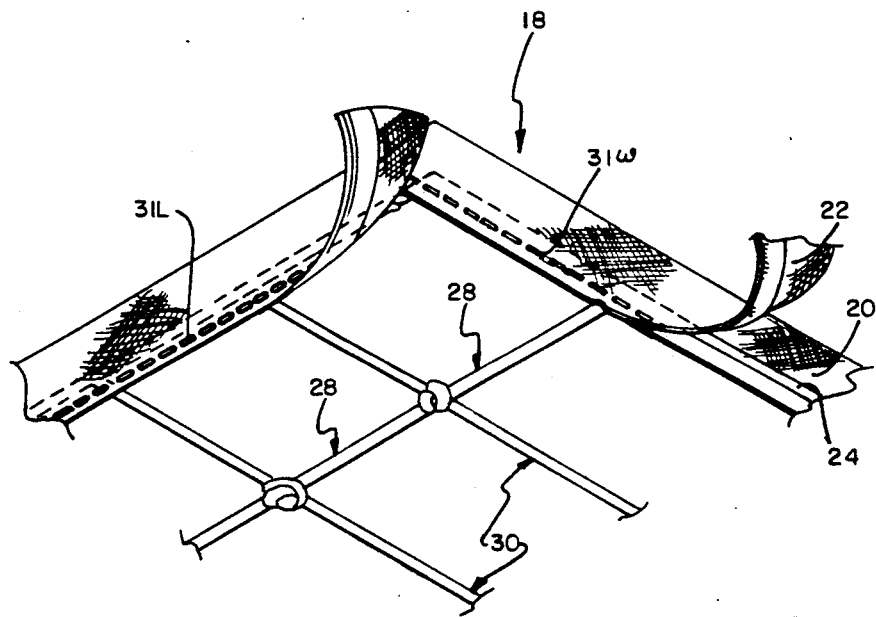
FIG. 16 is a partial perspective view of a corner of the cover.
Figure 17:
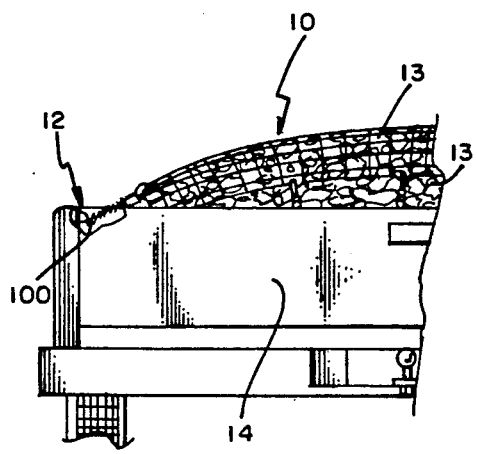
FIG. 17 is a partial rear elevational view of an open back vehicle having articles and the cover in an expanded form covering the articles and secured to the perimeter of the open back.

The connector means 26 of this invention comprises a flexible ring 60 that can be opened at 61 to engage around the border 18 as shown in FIGS. 10 and 11. Coupled to the ring 60 is an elastic, flexible helical spring or cord member 62 which returns to a collapsed position (as illustrated in FIG. 10) after being expanded. Cord member 62 terminates in an eye 64 at one end and an eye 66 at another end. Eye 64 is engaged to ring 60, whereas eye 66 is engaged to another ring 68. Coupled to the latter ring 68 is a hook means, generally illustrated as 70. Hook means 70 has a hook body 72 that has an internal cavity 74 with an open slot 76 on a top thereof that communicates with the internal cavity 74. A spring 78 is housed by the internal cavity 74. A bar member 80 with a head 82 protruding through slot 76 is slidably seated in the cavity 74 and is releasably biased against an end of the hook body 72. A U-shaped in cross section rotatable cylindrical collar 84 (having a protruding eye 86 that engages ring 68) is rotatably positioned around a recess 90 in the end of the hook body 72 (see FIG. 12). When the head 82 is slid towards the collar 84, hook means 70 opens up such as to be available for engaging the perimeter 12 of the open back 14 of the vehicle 16. A hook 100 with an elastic, flexible member 102 biased against an end thereof is releasably secured to the perimeter 12 as shown in FIGS. 4 or 5 and can be engaged by the hook means 70, or alternatively, hook 100 may be engaged to the border 18 directly as shown in FIG. 4. Connector means 26 is preferably additionally used with a large quantity of articles 13 as illustrated in FIG. 17. It is to be understood that connector means 26 may be reversed with hook means 70 engaged to the border 18 and the eye 64 or the ring 60 engaged to the hook 100 (see FIG. 17).

While the present invention has been described herein with reference to particular embodiments thereof, a latitude of the foregoing disclosure, and it will be appreciated that in some instances some features of the invention will be employed without a corresponding use of other features without departing from the scope of the invention as set forth.

I claim:

1. In combination with an article-filled open-back vehicle having an open back with a back perimeter, an openly woven mesh cover connected to the back perimeter and extended over said open back to keep articles from being blow from the open back during transit, said cover comprising a border member having a pair of superimposed flexible sheet members; a border strand enclosed by said pair of flexible sheet members; a connecting means for removably securing the border member to the back perimeter of the open back of the article-filled open-back vehicle; a plurality of warp strand means extending longitudinally and connecting to said border strand; a plurality of weft strand means extending cross-wise and secured to and woven with said warp strand means and to said border strand; and a first border seam passing through the pair of flexible sheet members for securing the pair of flexible sheet members together; and a second border seam passing through the pair of flexible sheet members for securing the pair of flexible sheet members together.

2. The combination of claim 1 wherein said sheet members are manufactured from a canvas material.

3. The combination of claim 1 wherein said sheet members are integrally bound to each other.

4. The combination of claim 3 wherein each of said warp strand means comprises a first warp end and a second warp end both of which are secured to said border strand, said warp strand means having a first warp loop defined by looping the first warp end and forming a first warp knot in close proximity to said first warp end and a plurality of interconnecting secondary warp loops with an initial secondary warp loop secured to and formed around said first warp loop by the second warp end passed through the first warp loop and a structural part of the warp strand means looped into the initial secondary warp loop and the second warp end passed over through and under the first warp loop, and subsequently the second warp end passed through the initial secondary warp loop to form the remaining interconnecting secondary warp loops.

5. The combination of claim 4 wherein a second secondary warp loop is formed around said initial secondary warp loop and is defined by the second warp end passed through the initial secondary warp loop and a structural part of the warp strand means looped into the second secondary warp loop and the second warp end passed over, through and under the initial secondary warp loop, and subsequently the second warp end passed through the second secondary warp loop to form the remaining interconnecting secondary warp loops.

6. The combination of claim 5 wherein each of said weft strand means comprises a first weft end and a second weft end both of which are secured to said border strand, said weft strand means having a first weft loop defined by looping the first weft end and forming a first weft knot in close proximity to said first weft end and a plurality of interconnecting secondary weft loops with an initial secondary weft loop secured to and formed around said first weft loop by the second weft end passed through the first weft loop and a structural part of the weft strand means looped into the initial secondary weft loop and the second weft end passed over through and under the first weft loop, and subsequently the second weft end passed through the initial secondary weft loop to form the remaining interconnecting secondary weft loops.

7. The combination of claim 6 wherein a second secondary weft loop is formed around said initial secondary weft loop and is defined by the second weft end passed through the initial secondary weft loop and a structural part of the weft strand means looped into the second secondary weft loop and the second weft end passed over, through and under the initial secondary weft loop, and subsequently the second weft end passed through the second secondary weft loop to form the remaining interconnecting secondary weft loops.

8. The combination of claim 7 wherein a securing point of said weft strand means to said warp strand means is defined by at least one secondary warp loop looped to at least one secondary weft loop formed by the second weft end having passed through the at least one secondary warp loop.

9. The combination of claim 8 wherein said connecting means comprises a first ring member secured around said border member, helical shaped elastic member attached to said first ring member; a second ring member secured to the helical shaped elastic member; and a first hook means secured to said second ring member, said first hook means having a spring biased member that is releasably biased against an end of the first hook means.

10. The combination of claim 9 wherein said connecting means additionally comprises a second hook means secured to the back perimeter of an article-filled open-back vehicle, said second hook means comprises an elastic member that biasingly lodges against an end of the second hook means; and said first hook means is releasably secured to said second hook means.

* * * * *